Patented Aug. 10, 1926.

1,595,538

UNITED STATES PATENT OFFICE.

HISAO YAMAMOTO, OF TOYONO-GUN, OSAKA-FU, AND KANICHI INOUYE, OF TSUKUBO-GUN, OKAYAMA-KEN, JAPAN, ASSIGNORS TO YUJI NOSAWA, OF AKASHI, HYOGO-KEN, JAPAN.

PROCESS OF PREPARING PYRETHRUM INSECTICIDES.

No Drawing. Application filed January 2, 1925, Serial No. 272, and in Japan May 6, 1924.

The invention relates to preparations for destroying insects and more especially to an improved preparation of pyrethrum and a process of preparing the same.

One of the principal objects of the invention is to provide an extract of the pyrethrum plant which shall contain the active principle thereof which is useful as an insecticide, in a form which shall be soluble in water and in other respects convenient for use and at the same time thoroughly efficient for the purpose intended.

The invention consists in the improved process by which the active principle of the pyrethrum plant is obtained, and in the improved product obtained by the said process, as set forth in the claims hereof, one embodiment of the invention being described in this specification.

Among the many preparations which are more or less in use as vermin destroyers and particularly as insecticides, products derived from the pyrethrum plant are undoubtedly the most suitable for general and domestic use. It is known, however, that the pyrethrum products at present known are more or less unsatisfactory from the point of view of economy and efficiency. The various preparations of this plant in powder form are more or less inconvenient to apply and objectionable on account of the fine dust produced which causes discomfort to the user unless extreme care is used, and also this form must be used when freshly prepared, as it suffers considerable deterioration if kept for a substantial time. When an aqueous solution is employed, the greater part of the active principle and effective elements of the plants are lost because they are insoluble in water. Extracts of pyrethrum other than aqueous are known, but these cannot be diluted with water, being insoluble therein, and yet are too strong to be used without dilution, and such are therefore not adapted for practical use.

In view of the above disadvantages, we have sought to produce an extract of pyrethrum which shall utilize to the fullest extent all the effective elements in the pyrethrum plant, which is capable of being diluted in a common and easily obtainable solvent, as water, and which when so diluted shall be easy to use, efficient as an insecticide, and harmless to men and animals.

In carrying our invention into effect in the embodiment thereof which we have selected for description in this specification, we take the flowers, shoots and leaves of the pyrethrum plant, which contain in resinous form the special substance which is the effective element or active principle which acts as an insecticide, and treat the flowers, shoots and leaves in an organic solvent such as alcohol, ether, petroleum ether, or the like, by immersing the pyrethrum in the solvent contained in a closed metallic extracting vessel to which heat may be applied to accelerate the extracting process. The solution thus obtained is carefully filtered to rid the same of impurities held in suspension, and the filtrate is then discharged into a vaporizer, consisting of a closed metalic vessel provided with an inlet for the solution and an outlet connecting with a pipe which leads to a condenser. In the vaporizer the solvent alone is driven off by the heat, and condensed to serve again as solvent. The effective element or active principle of the pyrethrum, being comparatively non-volatile, remains in the vaporizer after the solvent is evaporated, and at the end of the operation is removed therefrom. This residuum consists of a resinous liquid. It acts on insects more powerfully than powdered pyrethrum if dissolved in some suitable solvent and applied in the form of a spray. It has a distinctly acid reaction, so much so that the metallic vessels in which it is contained are apt to be more or less corroded, and owing to its acid reaction and its resinous quality, it is only with difficulty dissolved in water, and yet, in order to be easy of application it is necessary to thin it out with some solvent, and in order to be suitable for practical use it must be soluble in some solvent commonly available at low cost, as for instance water. We have therefore sought to remedy these disadvantages, and with this end in view we add to the more or less concentrated residuum an appropriate quantity of some suitable alkali, as for instance NaOH, KOH, or the like, and we have found that the result of this is to neutralize the acid more or less completely and at the same time to render the substance completely soluble in water, while not in the slightest degree diminishing the efficient action of the substance as an insecticide.

We have also found that a similar and equally efficient good effect is produced if the solvent is first alkalized to the proper degree, and the effective elements then extracted in the usual manner. The extract thus produced will be found to have its acid reaction sufficiently neutralized and to be perfectly soluble in water.

It is obvious that by alkalizing the substance and thereby making the same soluble in water, the effective elements can be much more conveniently, efficiently and economically applied than where the unalkalized extract is mixed with water, in which case most of the effective elements, being insoluble in water, merely remain in suspension for a short time and separate as a precipitate so that they cannot be applied as well as in the other. If the solvent is alkalized from the beginning of the work or at an intermediate stage of the work, the extraction is nearly constant, whereas if the solvent is not alkalized the extraction decreases towards the end of the process, according as the acidity of the solution increases, hindering the action of dissolving.

After alkalization of the solvent in the extracting and evaporating processes, the solution and the extract lose much of their corrosive effect. Consequently, metallic vessels can be safely used, resulting in considerable economy in operation, inasmuch as such vessels are more durable, and furthermore the cost of heating is less than in the case where porcelain or enamelled metallic vessels are required to be used in order to resist the action of the acid.

We will now give an example of the carrying out of our process. Take

|  | Parts. |
|---|---|
| Powdered pyrethrum flowers | 200 |
| Sodium hydroxide | 7 |
| Alcohol | 400 |
| Ether | 300 |
| Water | 300 |
| Petroleum ether | 100 |

The above mixture is charged into an extracting vessel and there kept for about twenty-four hours at a temperature of approximately 100° to 120° F. Then the mixture is filtered and the filtrate boiled at a temperature of approximately 120° to 140° F. in a vaporizer, thereby driving off the volatile solvent, the same being condensed in a worm and collected for further use in the usual way. The residue in the vaporizer will be found to consist of a pyrethrum extract of nearly neutral or slightly alkaline reaction.

In order to use this extract as an insecticide, the same may be diluted in from twenty to one hundred parts of water according to the kind of insect against which it is to be used, lukewarm water being preferable for this purpose, and the dilution of the extract thus obtained applied, preferably as a spray, on in such other manner as may be desired.

The extract prepared as above described is somewhat colored and even if used in a diluted form may in some cases slightly stain the wall or other object to which it may be applied, and in order to remove this objection in cases where the same may be considered as an objection, we add to the preparation a suitable quantity of some bleaching or decolorizing substance, sufficient to prevent discoloring effect ,when used in the desired manner.

The advantages of our improved process and of the product thereby produced will be obvious from what has been above said.

We do not limit ourselves to the exact form of the process or to the exact composition of the product which we have hereinabove described, as it is obvious that various modifications might be made in the same without departing from the spirit and scope of our invention.

Having thus described our invention, what we claim as new and desire to secure by Letters Patent, is as follows:

1. The improved method of producing an extract of the active principle of the pyrethrum plant adapted for use as an insecticide, which consists in dissolving parts of said plant in a solvent comprising alcohol, ether, petroleum ether, water and an alkali, and subjecting the dissolved mixture to a sufficient degree of heat to vaporize and distill off the more volatile elements of said mixture, leaving undistilled the water holding in solution the alkali and the extracted active principle of the pyrethrum plant.

2. The improved method of producing an extract of the active principle of the pyrethrum plant adapted for use as an insecticide, which consists in dissolving approximately 200 parts of portions of said plant in a solvent consisting of approximately 7 parts of sodium hydroxide, 400 parts of alcohol, 300 parts of ether, 300 parts of water and 100 parts of petroleum ether, and subjecting the dissolved mixture to a sufficient degree of heat to vaporize and distil off the more volatile elements of said mixture, leaving undistilled the water holding in solution the alkali and the extracted active principle of the pyrethrum plant.

3. The improved method of producing an extract of the active principle of the pyrethrum plant adapted for use as an insecticide, which consists in extracting such active principle in the usual manner, adding to the extract thus obtained a suitable quantity of an alkali, as sodium hydroxide, and subjecting the same to distillation whereby the more volatile components are expelled.

In witness whereof we have hereunto signed our names this 16th day of October, 1924.

HISAO YAMAMOTO.
KANICHI INOUYE.